US010296408B2

(12) United States Patent
Yabuki

(10) Patent No.: US 10,296,408 B2
(45) Date of Patent: May 21, 2019

(54) OPERATION MANAGEMENT APPARATUS, OPERATION MANAGEMENT METHOD, AND PROGRAM

(71) Applicant: NEC CORPORATION, Tokyo (JP)

(72) Inventor: Kentaro Yabuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/138,805

(22) Filed: Apr. 26, 2016

(65) Prior Publication Data

US 2016/0239366 A1    Aug. 18, 2016

Related U.S. Application Data

(63) Continuation of application No. 14/372,254, filed as application No. PCT/JP2013/000264 on Jan. 22, 2013, now Pat. No. 9,367,382.

(30) Foreign Application Priority Data

Jan. 23, 2012   (JP) .................. 2012-011076

(51) Int. Cl.
   *G06F 11/00*    (2006.01)
   *G06F 11/07*    (2006.01)
   *G06F 11/34*    (2006.01)

(52) U.S. Cl.
   CPC ........ *G06F 11/079* (2013.01); *G06F 11/0709* (2013.01); *G06F 11/0751* (2013.01);
   (Continued)

(58) Field of Classification Search
   CPC ............... G06F 11/079; G06F 11/0709; G06F 11/3409; G06F 11/2337
   See application file for complete search history.

(56) References Cited

U.S. PATENT DOCUMENTS 8,874,963 B2 * 10/2014 Yabuki ............... G06F 11/0751
                                                        714/26
8,880,946 B2 * 11/2014 Ishiou ................ G06F 11/0751
                                                        714/26
(Continued)

FOREIGN PATENT DOCUMENTS

CN      102099795 A     6/2011
EP       2523115 A1    11/2012
(Continued)

OTHER PUBLICATIONS

*SAP America, Inc.* v *Investpic, LLC*, May 15, 2018, United States Court of Appeals for the Federal Circuit, pp. 1-13 (Year: 2018).*

(Continued)

*Primary Examiner* — Marc Duncan
(74) *Attorney, Agent, or Firm* — Finnegan, Henderson, Farabow, Garrett & Dunner, L.L.P.

(57) ABSTRACT

In the invariant analysis, a fault cause is judged correctly. A correlation model storing unit (112) of an operation management apparatus (100) stores a correlation model including one or more correlation functions each of which indicates a correlation between two metrics different each other among a plurality of metrics in a system. The correlation destruction detecting unit (103) detects correlation destruction of the correlation which is included in the correlation model by applying newly inputted values of the plurality of metrics to the correlation model. The abnormality calculation unit (104) calculates and outputs a centrality degree which indicates a degree to which a first metric is estimated to be center of distribution of correlation destruction on the basis of a correlation destruction degree of one or more correlations between each of one or more second metrics having a correlation with the first metric and each of one or (Continued)

more metrics other than the first metric among the plurality of metrics.

10 Claims, 11 Drawing Sheets

(52) U.S. Cl.
CPC ...... *G06F 11/3409* (2013.01); *G06F 11/3447* (2013.01); *G06F 11/3452* (2013.01)

(56) References Cited

U.S. PATENT DOCUMENTS

| | | | | |
|---|---|---|---|---|
| 9,367,382 | B2* | 6/2016 | Yabuki | G06F 11/079 |
| 2007/0130330 | A1* | 6/2007 | Ridel | G06F 11/3495 709/224 |
| 2008/0016412 | A1 | 1/2008 | White et al. | |
| 2009/0217099 | A1* | 8/2009 | Kato | G06F 11/3409 714/37 |
| 2010/0205483 | A1* | 8/2010 | Ishiou | G06F 11/0709 714/26 |
| 2010/0218031 | A1* | 8/2010 | Agarwal | G06F 11/079 714/2 |
| 2011/0161743 | A1* | 6/2011 | Kato | G06F 11/0709 714/47.2 |
| 2012/0030522 | A1* | 2/2012 | Yabuki | G06F 11/0754 714/47.1 |
| 2014/0325276 | A1* | 10/2014 | Yabuki | G06F 11/0754 714/26 |
| 2015/0006960 | A1* | 1/2015 | Yabuki | G06F 11/0751 714/37 |
| 2015/0378806 | A1* | 12/2015 | Natsumeda | G06F 11/3447 714/37 |

FOREIGN PATENT DOCUMENTS

| | | |
|---|---|---|
| JP | 2006-11902 | 1/2006 |
| JP | 2009-199533 A | 9/2009 |
| WO | 2011/083687 A1 | 7/2011 |
| WO | 2011083687 A1 | 7/2011 |
| WO | 2011099341 A1 | 8/2011 |

OTHER PUBLICATIONS

Chinese Office Action for CN Application No. 20138006393.0 dated Dec. 14, 2015 with English Translation.

Tim Grieser: "Invariant Analyzer: An Automated Approach to System Performance Management", Oct. 1, 2011 (Oct. 1, 2011), pp. 1-11, XP055193383, Retrieved from the Internet: URL:http://fr.nec.com/fr_FR/en/documents/invariant_analyzer_idc_white_paper.pdf [retrieved on Jun. 3, 2015] Cited in EESR.

Jan Hauke et al: "Comparison of Values of Pearson's and Spearman's Correlation Coefficients on the Same Sets of Data". Quaestiones Geographicae,vol. 30, No. 2, Jan. 1, 2011 (Jan. 1, 2011). XP055192851, ISSN: 0137-477X. DOI:10.2478/v10117-011-0021-1 Cited in EESR.

Extended European Search Report of EP Application No. 13741453.8 dated Jul. 9, 2015.

International Search Report for PCT Application No. PCT/JP2013/000264, dated Apr. 2, 2013.

Notification of Reasons for Refusal dated Feb. 20, 2018, by the Japanese Patent Office in counterpart Japanese Patent Application No. 2017-052185.

Decision to Grant a Patent, dated Jul. 31, 2018, by the Japanese Patent Office in counterpart Japanese Patent Application No. 2017-052185.

* cited by examiner

OPERATION MANAGEMENT APPARATUS, OPERATION MANAGEMENT METHOD, AND PROGRAM

CROSS REFERENCE TO RELATED APPLICATIONS

This present application is a continuation application of U.S. patent application Ser. No. 14/372,254 filed on Jul. 15, 2014, which is a National Stage Entry of PCT/JP2013/000264 filed on Jan. 22, 2013, which claims the benefit of priority from Japanese Patent Application 2012-011076 filed on Jan. 23, 2012, the disclosures of all which are incorporated in their entirety by reference herein.

TECHNICAL FIELD

The present invention relates to an operation management apparatus, an operation management method and a program thereof, and in particular, relates to an operation management apparatus, an operation management method and a program thereof which detect a fault of a system.

BACKGROUND ART

Patent literature 1 discloses an example of an operation management system which generates a model of a system by using time-series information on system performance, and detects a fault of the system by using the generated model.

The operation management system described in the patent literature 1 determines a correlation function for each of combinations among a plurality of metrics (performance indexes) of a system on the basis of measurement values of the plurality of metrics, and generates a correlation model including a plurality of correlation functions each of which indicates a correlation. Then, the operation management system detects destruction of the correlation (correlation destruction) on the basis of newly inputted measurement values of the metrics by using the generated correlation model, and judges a fault cause on the basis of the detected correlation destruction. The above-mentioned art to analyze a fault cause on the basis of the correlation destruction is called an invariant analysis.

CITATION LIST

Patent Literature

[Patent literature 1] Japanese Patent Application Laid-Open No. 2009-199533

SUMMARY OF INVENTION

Technical Problem

According to the invariant analysis disclosed in the above-mentioned patent literature 1, for each of metrics, number or a ratio of correlations on which correlation destruction is detected out of correlation functions between the metric and each of the other metrics is calculated as an abnormality degree. Then, a fault cause is judged on the basis of the abnormality degree. However, there is a case that it is impossible to judge the fault cause correctly depending on the situation whether a correlation between the metrics exists or not, or number of correlations which each metric has.

FIGS. 10 to 13 are diagrams showing an example of a result of calculating the abnormality degree in the invariant analysis of patent literature 1. Here, each node indicates a metric, and an arrow between metrics indicates a correlation from one to the other out of two metrics. A node circled by a bold line indicates a metric related to a monitored apparatus or a resource having a fault cause (fault causing metric), and an arrow described by a bold line indicates a correlation on which correlation destruction is detected. A number written in a parenthesis and assigned to each node indicates an abnormality degree of the metric. In FIG. 10 and FIG. 12, due to a fault related to a metric SV1, correlation destruction is caused between the metric SV1 and the other metric. In FIG. 11 and FIG. 13, due to a fault related to a metric SV2, correlation destruction is caused between the metric SV2 and the metric SV1.

Each of FIG. 10 and FIG. 11 exemplifies a case that the number of correlations on which correlation destruction is detected is used as the abnormality degree. For example, in the case of FIG. 10, since the abnormality degree of the metric SV1 is large (abnormality degree=4), it is possible to judge that the metric SV1 has the fault cause. On the other hand, in the case of FIG. 11, since the abnormality degrees of the metrics SV1 and SV2 are identical each other (abnormality degree=1), it is impossible to judge which of the metrics SV1 and SV2 has the fault cause. As mentioned above, in the case that the number of correlations on which correlation destruction is detected is used as the abnormality degree, there is a case that it is impossible to judge a fault cause correctly due to influence of correlation destruction which is caused by the other fault as shown in FIG. 11 or influence of correlation destruction which is caused by an incidental noise.

Each of FIG. 12 and FIG. 13 exemplifies a case that a ratio of the correlation on which the correlation destruction is detected is used as the abnormality degree. For example, in the case of FIG. 12, since the abnormality degree of metrics SV1 to SV5 are identical each other (abnormality degree=1.0), it is impossible to judge which of the metrics SV1 to SV5 has the fault cause. On the other hand, in the case of FIG. 13, since the abnormality degree of the metric SV2 (abnormality degree=1.0) is larger than the abnormality degree of the metric SV1 (abnormality degree=0.25), it is possible to judge that the metric SV2 has the fault cause. As mentioned above, in the case that the ratio of the correlation on which the correlation destruction is detected is used as the abnormality degree, it is possible to improve the problem which is caused in the case that the number of the correlation is used as the abnormality degree. However, as shown in FIG. 12, there is a case that it is impossible to judge a fault cause correctly depending on the number of the correlations of each metric.

An object of the present invention is to solve the above-mentioned problem, and specifically to provide an operation management apparatus, an operation management method, and a program thereof which are able to judge a fault cause correctly in the invariant analysis.

Solution to Problem

An operation management apparatus according to an exemplary aspect of the invention includes: a correlation model storing means for storing a correlation model including one or more correlation functions each of which indicates a correlation between two metrics different each other among a plurality of metrics in a system; a correlation destruction detecting means for detecting correlation destruction of the correlation which is included in the correlation model by applying newly inputted values of the plurality of metrics to the correlation model; and an abnormality calculation means for calculating and outputting a centrality degree which indicates a degree to which a first metric is estimated to be center of distribution of correlation destruction on the basis of a correlation destruction degree of one or more correlations between each of one or more second metrics having a correlation with the first metric and each of one or more metrics other than the first metric among the plurality of metrics.

An operation management method according to an exemplary aspect of the invention includes: storing a correlation model including one or more correlation functions each of which indicates a correlation between two metrics different each other among a plurality of metrics in a system; detecting correlation destruction of the correlation which is included in the correlation model by applying newly inputted values of the plurality of metrics to the correlation model; and calculating and outputting a centrality degree which indicates a degree to which a first metric is estimated to be center of distribution of correlation destruction on the basis of a correlation destruction degree of one or more correlations between each of one or more second metrics having a correlation with the first metric and each of one or more metrics other than the first metric among the plurality of metrics.

A computer readable storage medium according to an exemplary aspect of the invention, records thereon a program, causing a computer to perform a method comprising: storing a correlation model including one or more correlation functions each of which indicates a correlation between two metrics different each other among a plurality of metrics in a system; detecting correlation destruction of the correlation which is included in the correlation model by applying newly inputted values of the plurality of metrics to the correlation model; and calculating and outputting a centrality degree which indicates a degree to which a first metric is estimated to be center of distribution of correlation destruction on the basis of a correlation destruction degree of one or more correlations between each of one or more second metrics having a correlation with the first metric and each of one or more metrics other than the first metric among the plurality of metrics.

Advantageous Effect of Invention

An effect of the present invention is that it is possible to judge a fault cause correctly in the invariant analysis.

DESCRIPTION OF EMBODIMENTS (First Exemplary Embodiment)

Next, a first exemplary embodiment of the present invention will be described.

Figure 2:
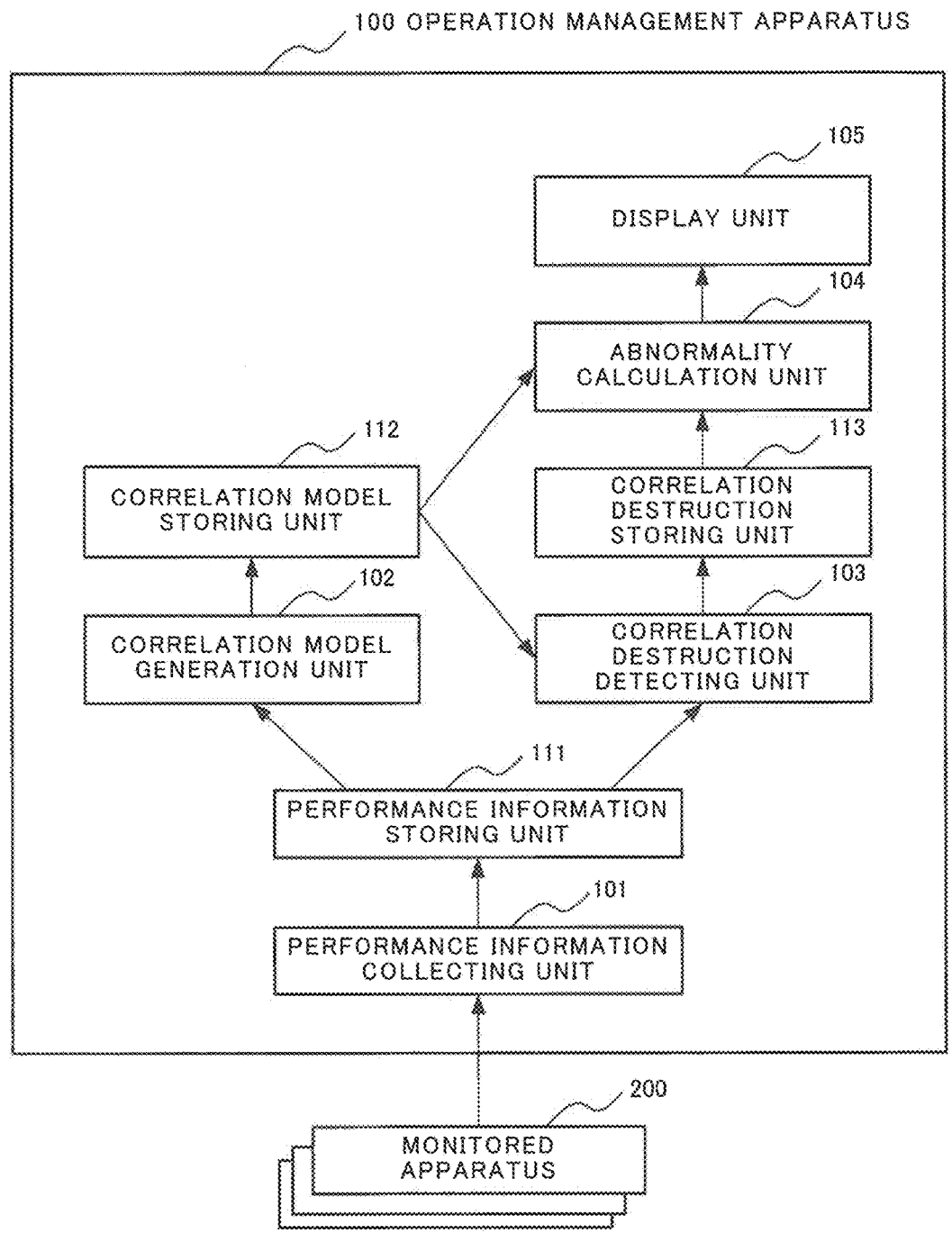
FIG. 2 is a block diagram showing a configuration of an operation management system which includes an operation management apparatus 100, in the first exemplary embodiment of the present invention.

Firstly, a configuration according to the first exemplary embodiment of the present invention will be described. FIG. 2 is a block diagram showing a configuration of an operation management system which includes an operation management apparatus 100, in the first exemplary embodiment of the present invention.

Referring to FIG. 2, the operation management system in the first exemplary embodiment of the present invention includes the operation management apparatus 100, and one or more monitored apparatuses 200. The operation management apparatus 100 and the monitored apparatus 200 are connected each other through a network.

The monitored apparatus 200 is an apparatus, which is a component of a system, such as a Web server, a Database server.

The monitored apparatus 200 measures actual data (measurement value) on performance values of plural items of the monitored apparatus 200 at a periodical interval, and sends the measurement data to the operation management apparatus 100. As the item of the performance value, a rate of using a computer resource or an amount of usage of the computer resource such as, for example, a rate of using CPU (Central Processing Unit), a rate of using a memory, a rate of accessing a disk is used.

Here, a set of the monitored apparatus 200 and the item of the performance value is defined as a metric (performance index), and a set of values of the plural metrics measured at the same time is defined as performance information. The metric is expressed by a numerical value of an integer or a decimal. The metric is corresponding to the element which is described in patent literature 1.

The operation management apparatus 100 generates, on the basis of the performance information collected from the monitored apparatus 200 which is a monitoring target, a correlation model 122 with respect to the monitored apparatus 200. Then, the operation management apparatus 100 detects a fault or abnormality of the monitored apparatus 200 by using the generated correlation model 122.

The operation management apparatus 100 includes a performance information collecting unit 101, a correlation model generation unit 102, a correlation destruction detecting unit 103, an abnormality calculation unit 104, a display unit 105, a performance information storing unit 111, a correlation model storing unit 112, and a correlation destruction storing unit 113.

The performance information collecting unit 101 collects the performance information from the monitored apparatus 200, and stores time series variation of the performance information in the performance information storing unit 111 as sequential performance information 121.

The correlation model generation unit 102 generates the correlation model 122 of the system including the monitored apparatus 200, on the basis of the sequential performance information 121.

Here, the correlation model 122 includes, for each combination of two metrics in a plurality of metrics, a correlation function (or transformation function) indicating a correlation between the two metrics. The correlation function is a function which estimates, from time series of one metric value, time series of other metric values. The correlation model generation unit 102 determines a coefficient of the correlation function for each combination of the metrics on the basis of the sequential performance information 121 which is collected for a predetermined modeling time period. Similarly to the case of the operation management apparatus described in patent literature 1, the coefficient of the correlation function is determined in a system identification process which is carried out to the time-series of measurement values of the metrics.

Note that, similarly to the case of the operation management apparatus described in patent literature 1, the correlation model generation unit 102 may calculate a weight of the correlation function for each combination of the metrics, and may generate a set of the correlation functions which have the weights equal to or larger than a predetermined value as the correlation model 122.

The correlation model storing unit 112 stores the correlation model 122 generated by the correlation model generation unit 102.

Figure 4:
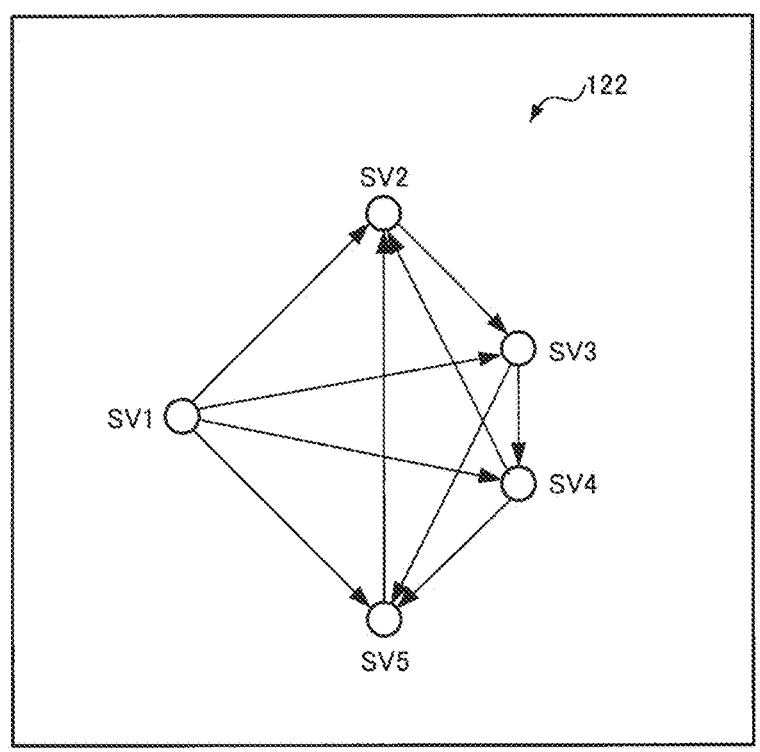
FIG. 4 is a diagram showing an example of a correlation model 122, in the first exemplary embodiment of the present invention.

FIG. 4 is a diagram showing an example of the correlation model 122, in the first exemplary embodiment of the present invention. In FIG. 4, the correlation model 122 is expressed by a graph which includes a node and an arrow. Here, each node indicates a metric, and the arrow between the metrics indicates a correlation from one to the other out of the two metrics. A correlation function is determined for each of the correlations.

According to the correlation model 122 shown in FIG. 4, one metric exists in each of the monitored apparatuses 200 which have apparatus identifiers SV1 to SV5 respectively (hereinafter, referred to as metrics SV1 to SV5 respectively), and the correlation is indicated for each combination of two metrics out of the metrics SV1 to SV5.

Similarly to the case of the operation management apparatus described in patent literature 1, the correlation destruction detecting unit 103 detects correlation destruction of the correlations included in the correlation model 122, on the basis of the performance information inputted newly.

Here, similarly to the description of patent literature 1, the correlation destruction detecting unit 103 calculates, through inputting a measurement value of one metric out of two metrics of the plural metrics into the correlation function corresponding to the two metrics, an estimation value of the other metric. In the case that a difference between the estimation value and a measurement value of the other metric (transformation error caused by the correlation function) is equal to or larger than a predetermined value, the correlation destruction detecting unit 103 detects it as the correlation destruction of the correlation between the two metrics.

The correlation destruction storing unit 113 stores correlation destruction information 123 indicating correlations on which correlation destruction is detected.

Figure 5:
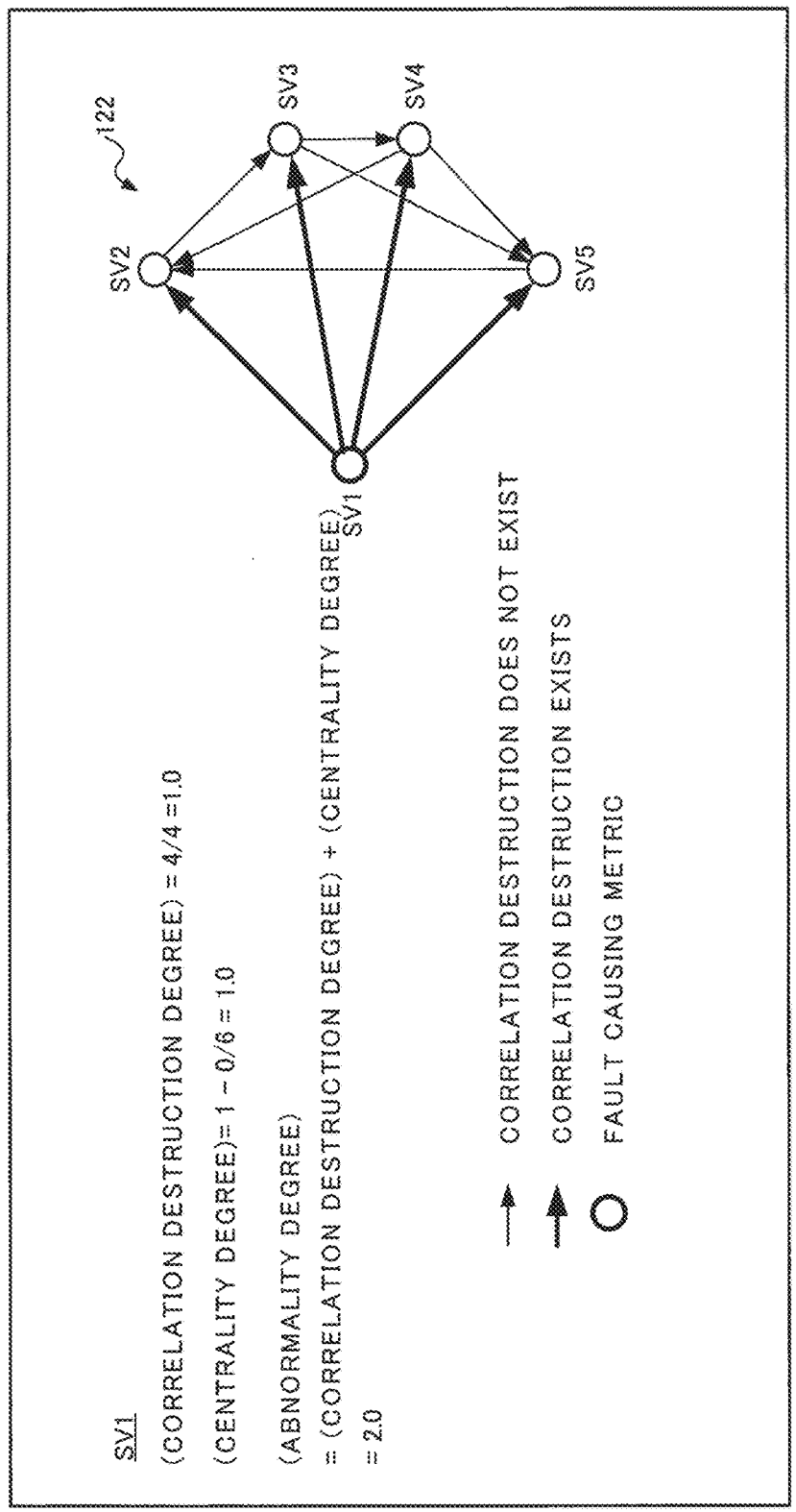
FIG. 5 is a diagram showing an example of detecting correlation destruction and calculating an abnormality degree, in the first exemplary embodiment of the present invention.
Figure 6:
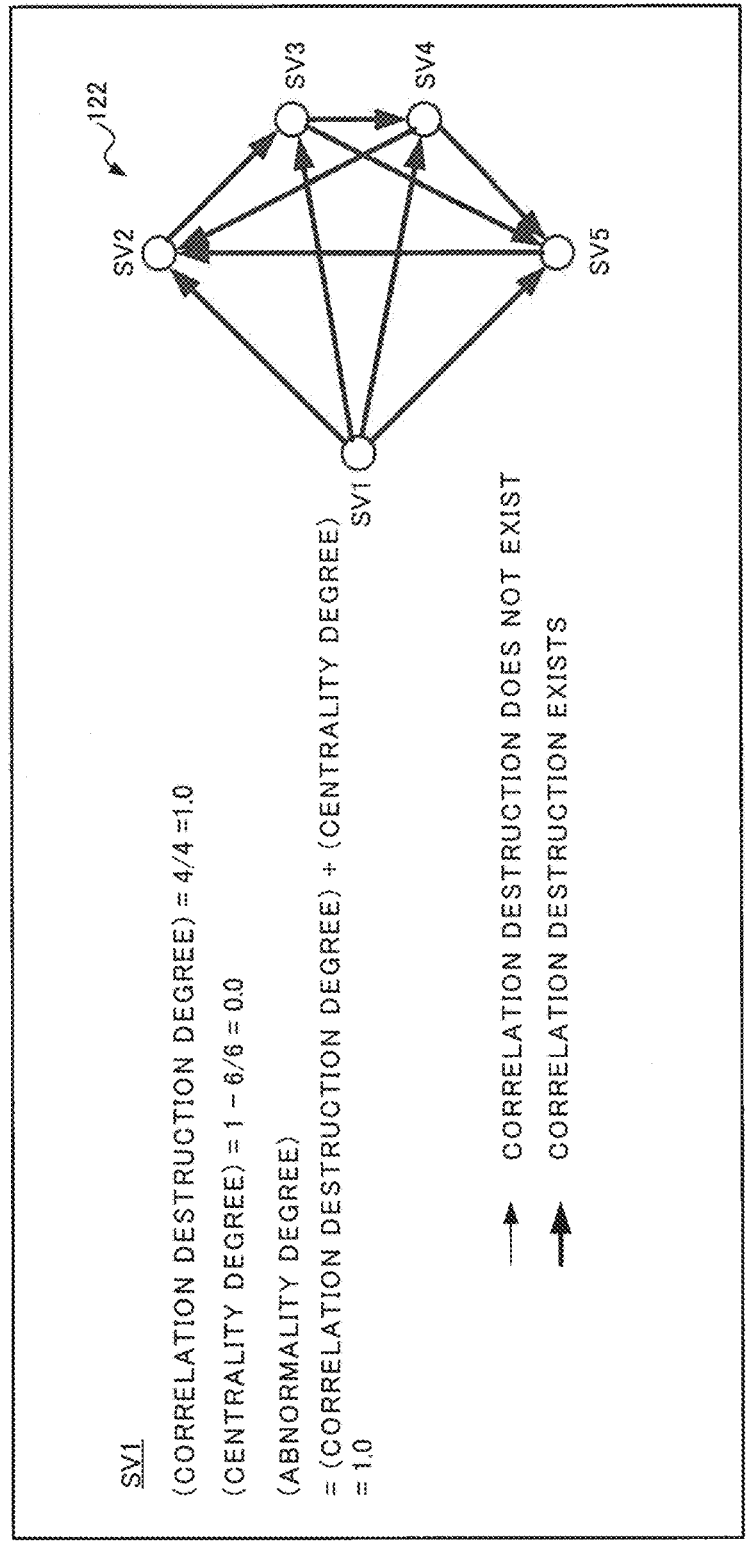
FIG. 6 is a diagram showing another example of detecting correlation destruction and calculating an abnormality degree, in the first exemplary embodiment of the present invention.

Each of FIG. 5 and FIG. 6 is a diagram showing an example of detecting correlation destruction and calculating an abnormality degree, in the first exemplary embodiment of the present invention. In FIG. 5 and FIG. 6, an arrow expressed by a bold line indicates a correlation on which correlation destruction is detected on the correlation model 122 shown in FIG. 4. In FIG. 5, a node expressed by a bold line indicates a metric of the monitored apparatus 200 which has a fault cause (fault causing metric). According to the example shown in FIG. 5, due to the fault of the monitored apparatus 200 having the apparatus identifier SV1, correlation destruction is caused on the correlation functions between the metric SV1 and each of the metrics SV2 to SV5. According to the example shown in FIG. 6, due to the fault of any of the monitored apparatuses 200 having the apparatus identifiers SV2 to SV5, or a noise which intermingles with the measurement values of the metrics, correlation destruction is caused on each of correlation functions.

The abnormality calculation unit 104 calculates an abnormality degree of each metric on the basis of distribution of correlation destruction on the correlation model 122. Hereinafter, the method of calculating the abnormality degree will be described with reference to FIG. 5 and FIG. 6.

As shown in FIG. 5, in the case that a fault is caused on the monitored apparatus 200 or the resource, abnormality is caused on the metric (fault causing metric) related to the monitored apparatus 200 and the resource. Consequently, correlation destruction is caused on correlations between the fault causing metric and metrics having a correlation with the fault causing metric (adjacent metrics). Here, as a correlation destruction degree of the correlation function between a metric (first metric, SV1 in this case) and each of adjacent metrics (second metrics, SV2 to SV5 in this case) to the first metric is high, it is estimated that the possibility that the metric is corresponding to the fault causing metric is high.

Moreover, due to spread of the fault, abnormalities are caused on the adjacent metrics to the fault causing metric and other metrics. Consequently, correlation destruction may be caused on correlations between each of the adjacent metrics and each of the other metrics. However, it is assumed that a possibility that correlation destruction is caused between each of the adjacent metrics and each of the other metrics is lower than a possibility that correlation destruction is caused between the fault causing metric and each of the adjacent metrics. In this case, the correlation destruction is distributed centering around the fault causing metric on the correlation model 122. Accordingly, as shown in FIG. 5, in the case that number of corrupted correlations among the correlations between each of adjacent metrics (second metrics, SV2 to SV5 in this case) to a metric (first metric, SV1 in this case) and each of metrics other than the first metric is small, that is, in the case that the first metric exists in a center of the distribution of the correlation destruction, it is estimated that the possibility that the first metric is corresponding to the fault causing metric is high.

Moreover, as shown in FIG. 6, in the case that number of corrupted correlations among the correlations between each of adjacent metrics (second metrics, SV2 to SV5 in this case) to a metric (first metric, SV1 in this case) and each of metrics other than the first metric is large, that is, in the case that the first metric does not exist in a center of the distribution of the correlation destruction, it is estimated that the possibility that the first metric is corresponding to the fault causing metric is low.

The abnormality calculation unit 104 calculates a degree of destruction of a correlation (a correlation destruction degree) and a degree of existing in the center of distribution of the correlation destruction (a centrality degree) for each metric, and calculates an abnormality degree on the basis of the correlation destruction degree and the centrality degree.

The abnormality calculation unit 104 calculates the correlation destruction degree, for example, by using Equation 1.

$$\text{correlation destruction degree} = \frac{N_{d0}}{N_0} \quad \text{[Equation 1]}$$

Here, $N_0$ is number of the correlations which a target metric for calculating the abnormality degree has, and $N_{d0}$ is number of the correlations on which correlation destruction is detected out of the correlations which the target metric has.

For example, in the case of FIG. 5, the abnormality calculation unit 104 obtains the correlation destruction degree 1.0 for the metric SV1. In the case of FIG. 6, the abnormality calculation unit 104 also obtains the correlation destruction degree 1.0 for the metric SV1.

The abnormality calculation unit 104 calculates the centrality degree, for example, by using Equation 2.

$$\text{centrality degree} = \begin{cases} 1 - \frac{N_d}{N} & \ldots (N \neq 0) \\ 1 & \ldots (N = 0) \end{cases} \quad \text{[Equation 2]}$$

$$N = \sum_{i=1}^{n} N_i$$

$$N_d = \sum_{i=1}^{n} N_{di}$$

Here, n is number of the metrics (adjacent metrics) having a correlation with the target metric for calculating the abnormality degree. $N_i$ is number of correlations between an i'th adjacent metric and each of the metrics other than the target metric, and $N_{di}$ is number of correlations on which correlation destruction is detected out of the correlations between the i'th adjacent metric and each of the metrics other than the target metric.

For example, in the case of FIG. 5, the abnormality calculation unit 104 obtains the centrality degree 1.0 for the metric SV1. In the case of FIG. 6, the abnormality calculation unit 104 obtains the centrality degree 0 for the metric SV1.

Furthermore, the abnormality calculation unit 104 calculates the abnormality degree, for example, by using Equation 3.

abnormality degree)=(correlation destruction degree)+(centrality degree) [Equation 3]

For example, in the case of FIG. 5, the abnormality calculation unit 104 obtains the abnormality degree 2.0 for the metric SV1. In the case of FIG. 6, the abnormality calculation unit 104 obtains that the abnormality degree 1.0 for the metric SV1.

Note that, as long as the correlation destruction degree of the correlation functions which the target metric has is calculated, the abnormality calculation unit 104 may calculate the correlation destruction degree not only by using Equation 1 but also by another method. For example, the abnormality calculation unit 104 may calculate the correlation destruction degree on the basis of number of the correlations on which correlation destruction is detected out of the correlations which the target metric has, or on the basis of an amount of a transformation error caused by the correlation function which the target metric has.

Moreover, as long as the degree of existing in the center of the distribution of correlation destruction for the target metric is calculated, the abnormality calculation unit 104 may calculate the centrality degree not only by using Equation 2 but also by another method. For example, the abnormality calculation unit 104 may calculate the centrality degree on the basis of number of the correlations on which correlation destruction is detected out of the correlations which the adjacent metrics have, or on the basis of an amount of a transformation error caused by the correlation function which the adjacent metrics have. Furthermore, the abnormality calculation unit 104 may calculate the centrality degree of, not only the distribution of the correlation destruction related to the adjacent metrics, but also distribution of correlation destruction detected in a range of a predetermined number of correlation functions from the target metric on the correlation model 122, or distribution of correlation destruction detected on a whole of the correlation model 122.

Moreover, as long as high abnormality degree is obtained as correlation destruction degree increases or centrality degree increases, the abnormality calculation unit 104 may calculate the abnormality degree not only by Equation 3 but also by another method. For example, the abnormality calculation unit 104 may calculate the abnormality degree through multiplying the correlation destruction degree by the centrality degree.

The abnormality calculation unit 104 outputs an analysis result 130 including the calculated correlation destruction degree, centrality degree, and abnormality degree. The display unit 105 displays the analysis result 130. Here, the abnormality calculation unit 104 may output the analysis result 130 as a file.

Note that the operation management apparatus 100 may be a computer which includes CPU and a storage medium storing a program and which operates in accordance with control of the program. Moreover, the performance information storing unit 111, the correlation model storing unit 112 and the correlation destruction storing unit 113 may be configured by respective storage media or may be configured by one storage medium.

Next, operation of the operation management apparatus 100 in the first exemplary embodiment of the present invention will be described.

Figure 3:
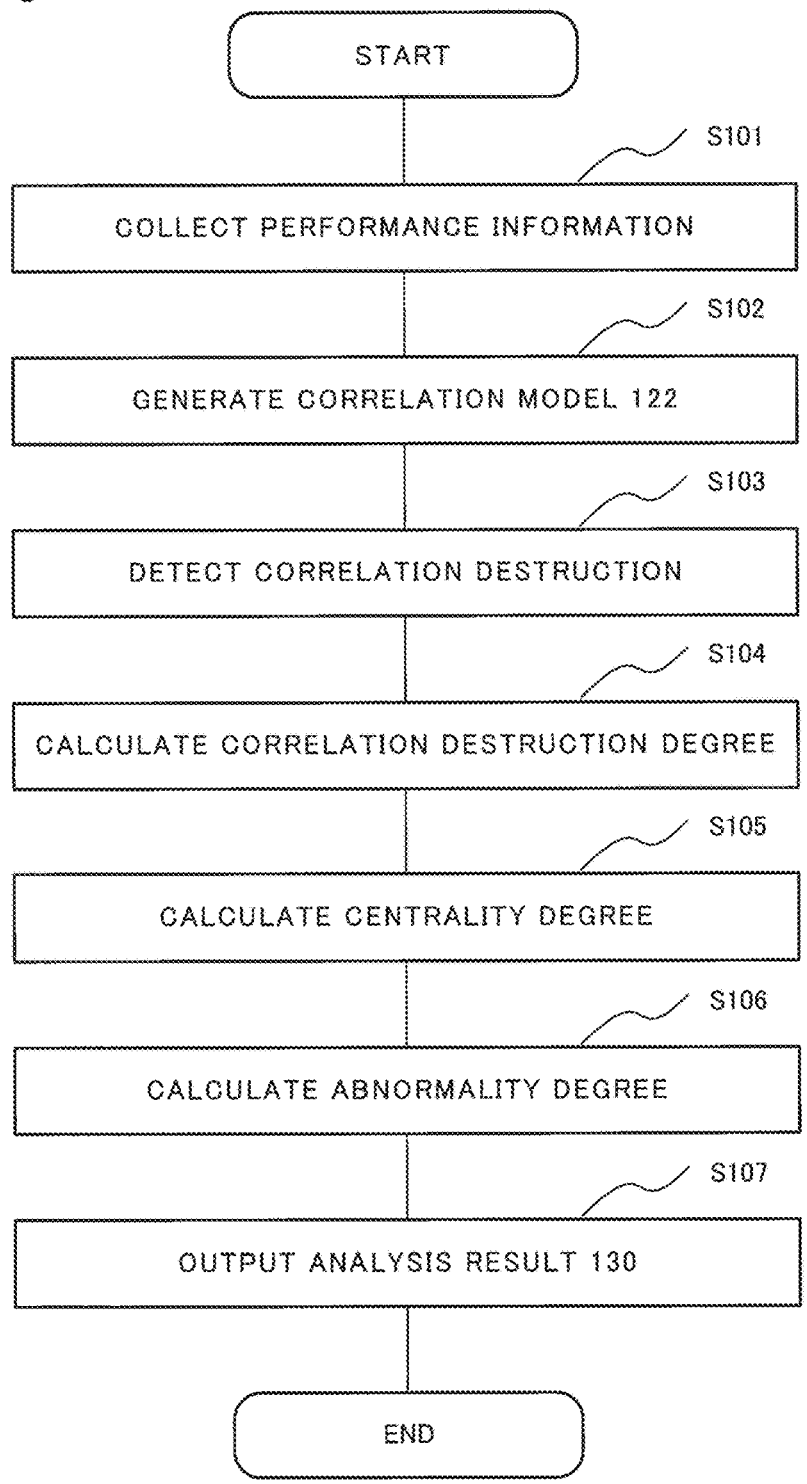
FIG. 3 is a flowchart showing a process, which is carried out by the operation management apparatus 100, in the first exemplary embodiment of the present invention.

FIG. 3 is a flowchart showing a process, which is carried out by the operation management apparatus 100, in the first exemplary embodiment of the present invention.

Firstly, the performance information collecting unit 101 of the operation management apparatus 100 collects performance information from the monitored apparatus 200, and stores the collected performance information in the performance information storing unit 111 (Step S101).

The correlation model generation unit 102 refers to the sequential performance information 121 stored in the performance information storing unit 111, and generates a correlation model 122 on the basis of the performance information collected during a predetermined modeling period which is designated by a manager or the like, and stores the correlation model 122 in the correlation model storing unit 112 (Step S102).

Figure 7:
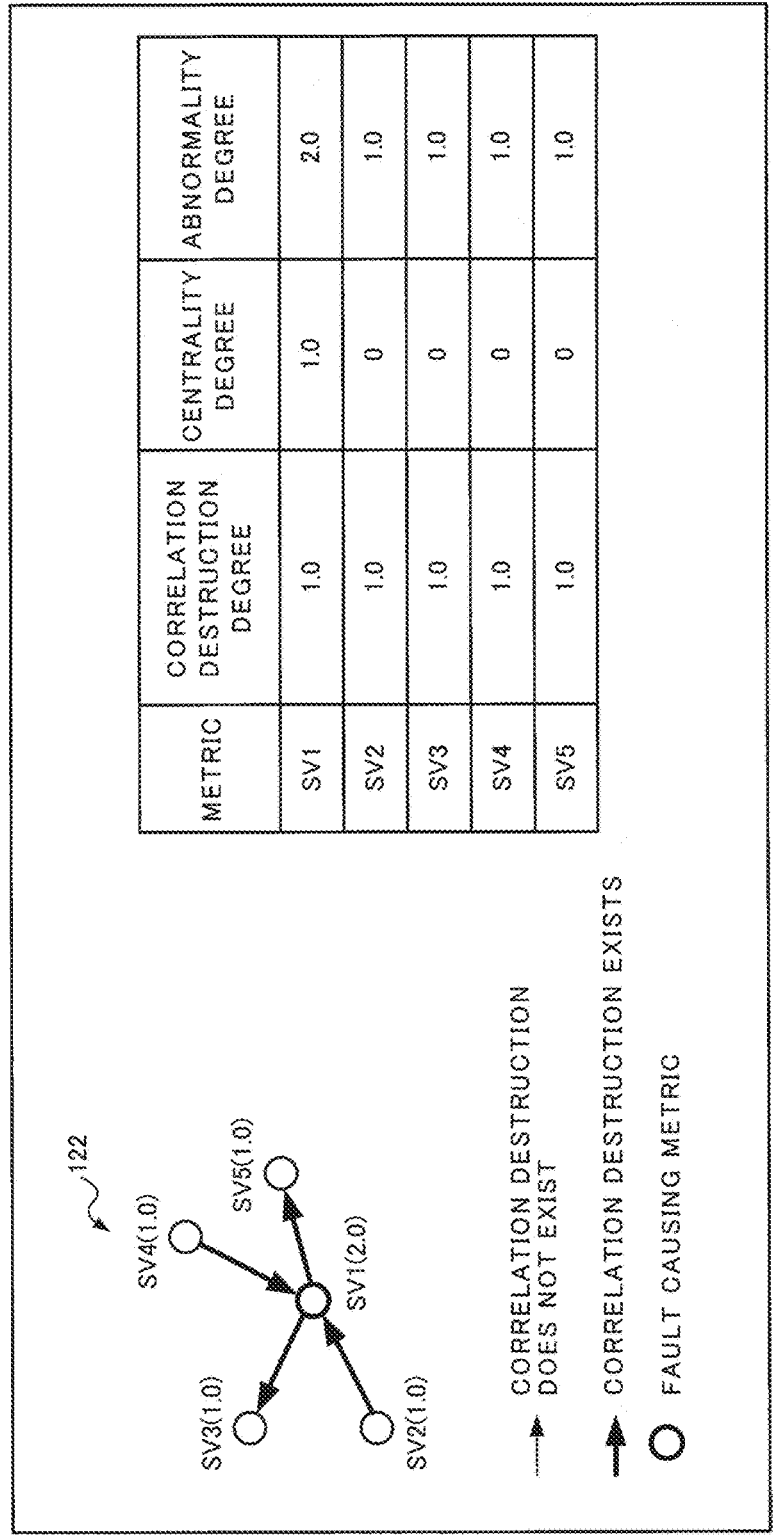
FIG. 7 is a diagram showing an example of a result of calculating an abnormality degree, in the first exemplary embodiment of the present invention.
Figure 8:
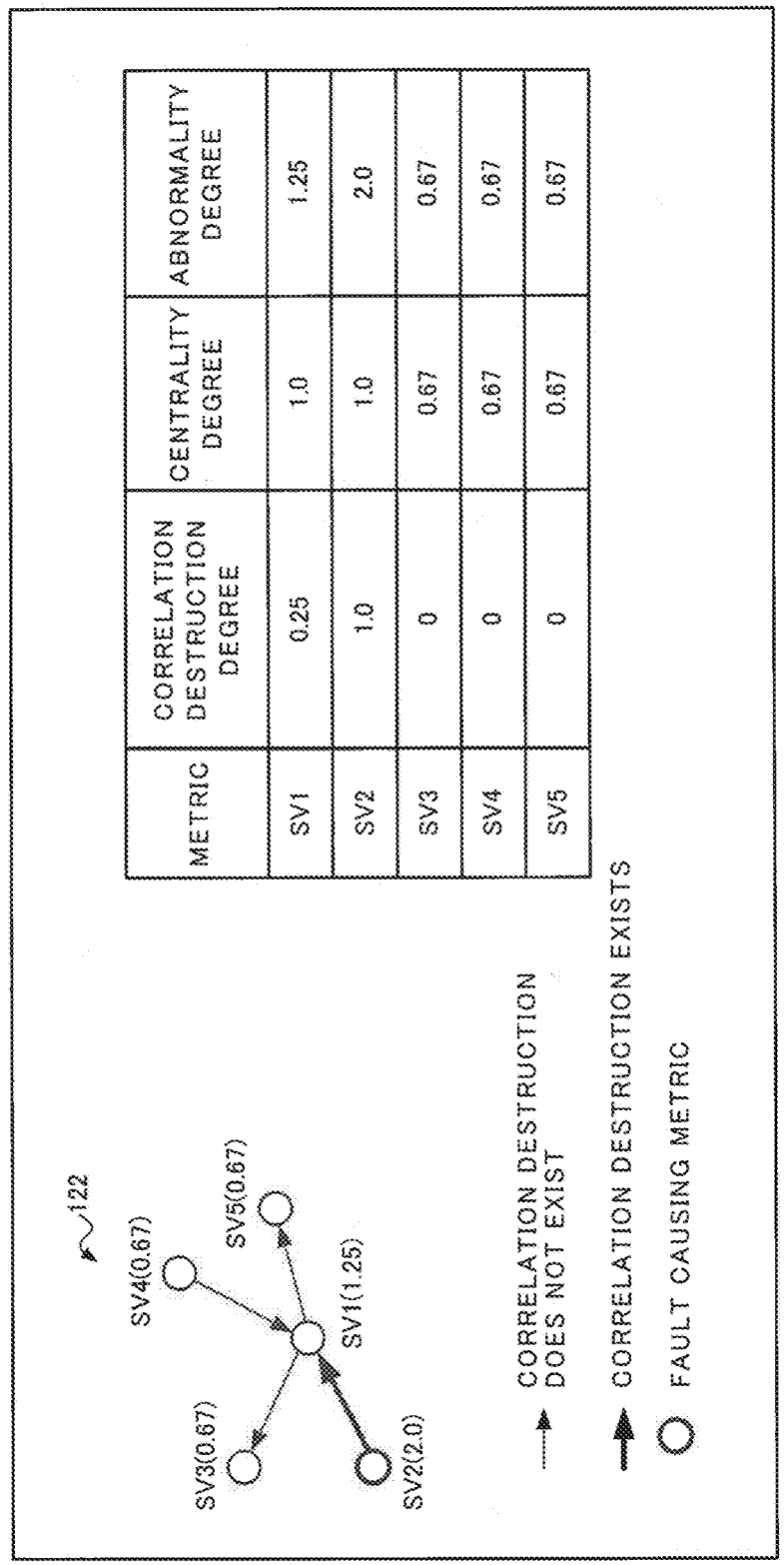
FIG. 8 is a diagram showing another example of a result of calculating an abnormality degree, in the first exemplary embodiment of the present invention.
Figure 10:
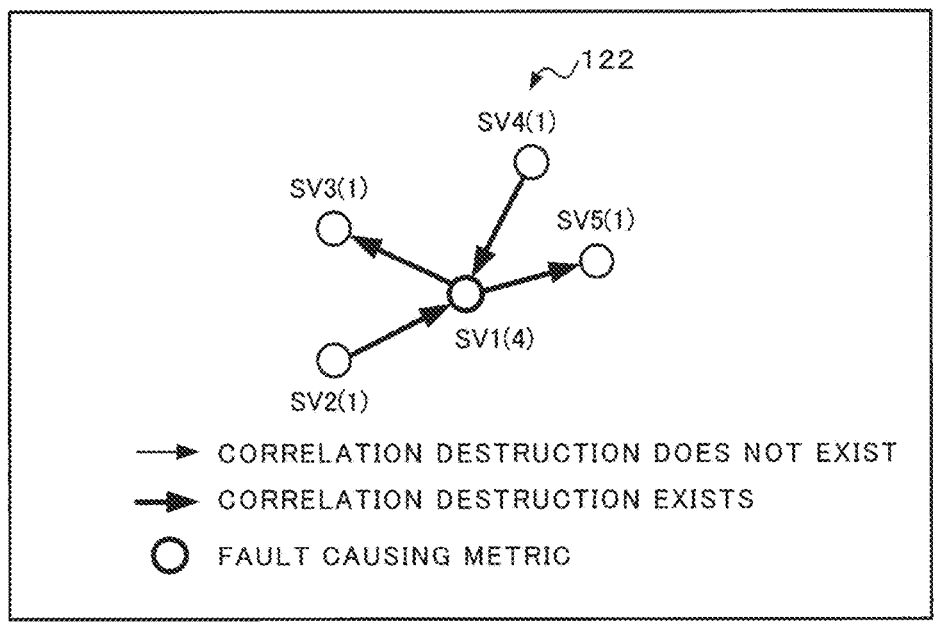
FIG. 10 is a diagram showing an example of a result of calculating an abnormality degree, in the invariant analysis of patent literature 1.
Figure 11:
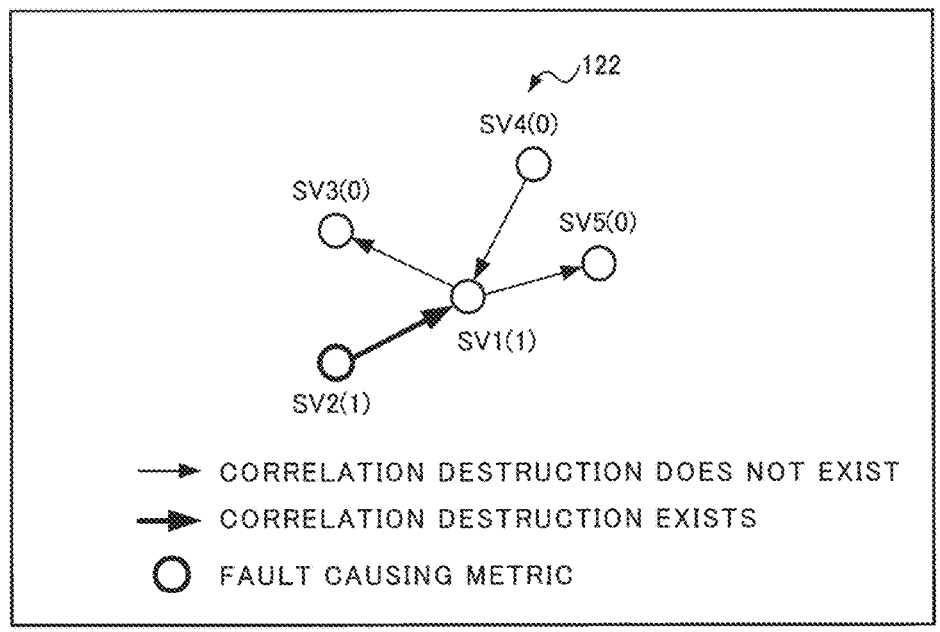
FIG. 11 is a diagram showing another example of a result of calculating an abnormality degree, in the invariant analysis of patent literature 1.
Figure 12:
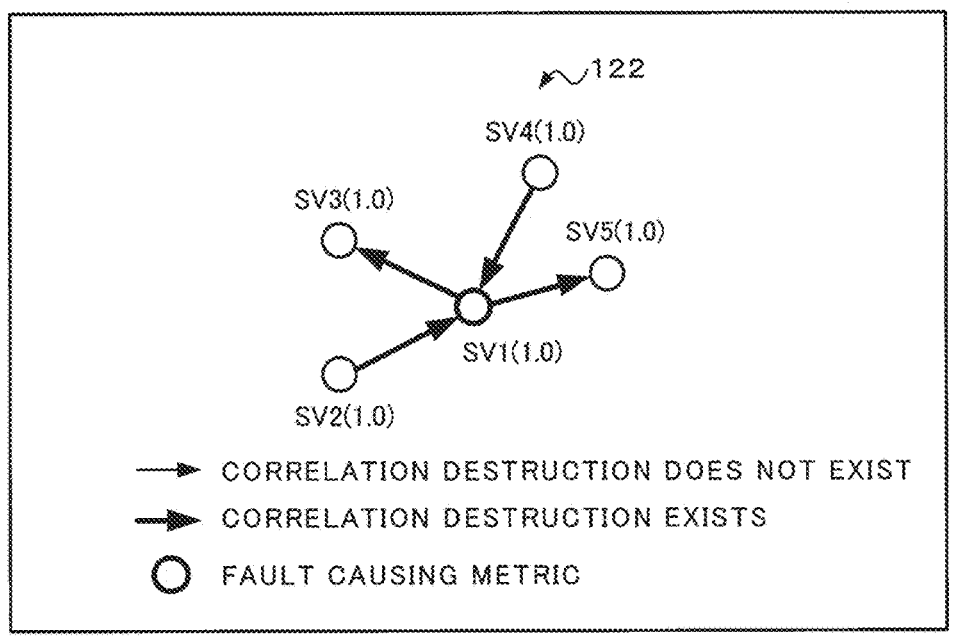
FIG. 12 is a diagram showing another example of a result of calculating an abnormality degree, in the invariant analysis of patent literature 1.
Figure 13:
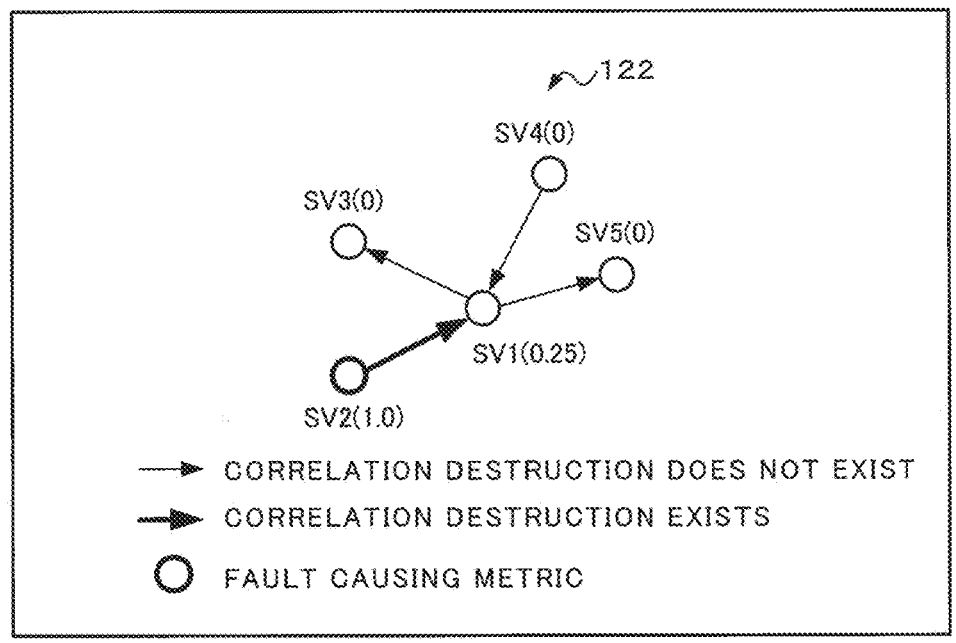
FIG. 13 is a diagram showing another example of a result of calculating an abnormality degree, in the invariant analysis of patent literature 1.

Each of FIG. 7 and FIG. 8 is a diagram showing an example of a result of calculating an abnormality degree, in the first exemplary embodiment of the present invention. The correlation model 122 and the detecting situation of the correlation destruction shown in FIG. 7 are corresponding to the correlation model 122 and the detecting situation of the correlation destruction shown in FIG. 10 and FIG. 12, and the correlation model 122 and the detecting situation of the correlation destruction shown in FIG. 8 are corresponding to the correlation model 122 and the detecting situation of the correlation destruction shown in FIG. 11 and FIG. 13.

For example, the correlation model generation unit 102 generates the correlation model 122 as shown in FIG. 7.

Next, the correlation destruction detecting unit 103 detects correlation destruction of the correlations included in the correlation model 122, by using performance information collected newly by the performance information collecting unit 101, and generates correlation destruction information 123 (Step S103). The correlation destruction detecting unit 103 stores the correlation destruction information 123 in the correlation destruction storing unit 113.

For example, the correlation destruction detecting unit 103 detects correlation destruction as shown in FIG. 7.

Next, the abnormality calculation unit 104 calculates a correlation destruction degree of each metric by using Equation 1 (Step S104). The abnormality calculation unit 104 calculates a centrality degree of each metric by using Equation 2 (Step S105). The abnormality calculation unit 104 calculates an abnormality degree of each metric by using Equation 3 (Step S106).

For example, the correlation destruction detecting unit 103 calculates correlation destruction degrees, centrality degrees, and abnormality degrees as shown in the table of FIG. 7. In FIG. 7, the centrality degree and the abnormality degree of the metric SV1 are larger than ones of the other metrics. Accordingly, it is judged that the possibility that the metric SV1 is a fault causing metric is high.

In the case that the correlation destruction is detected as shown in FIG. 8, abnormality degrees are calculated as shown in the table of FIG. 8. In FIG. 8, the centrality degree of each of the metrics SV1 and SV2 is larger than one of the other metrics, and the abnormality degree of the metric SV2 is larger than one of the other metrics. Accordingly, it is judged that the possibility that the metric SV2 is a fault causing metric is high.

Next, the abnormality calculation unit 104 outputs the analysis result 130 including the calculated correlation destructed degrees, centrality degrees, and abnormality degrees through the display unit 105 (Step S107).

Figure 9:
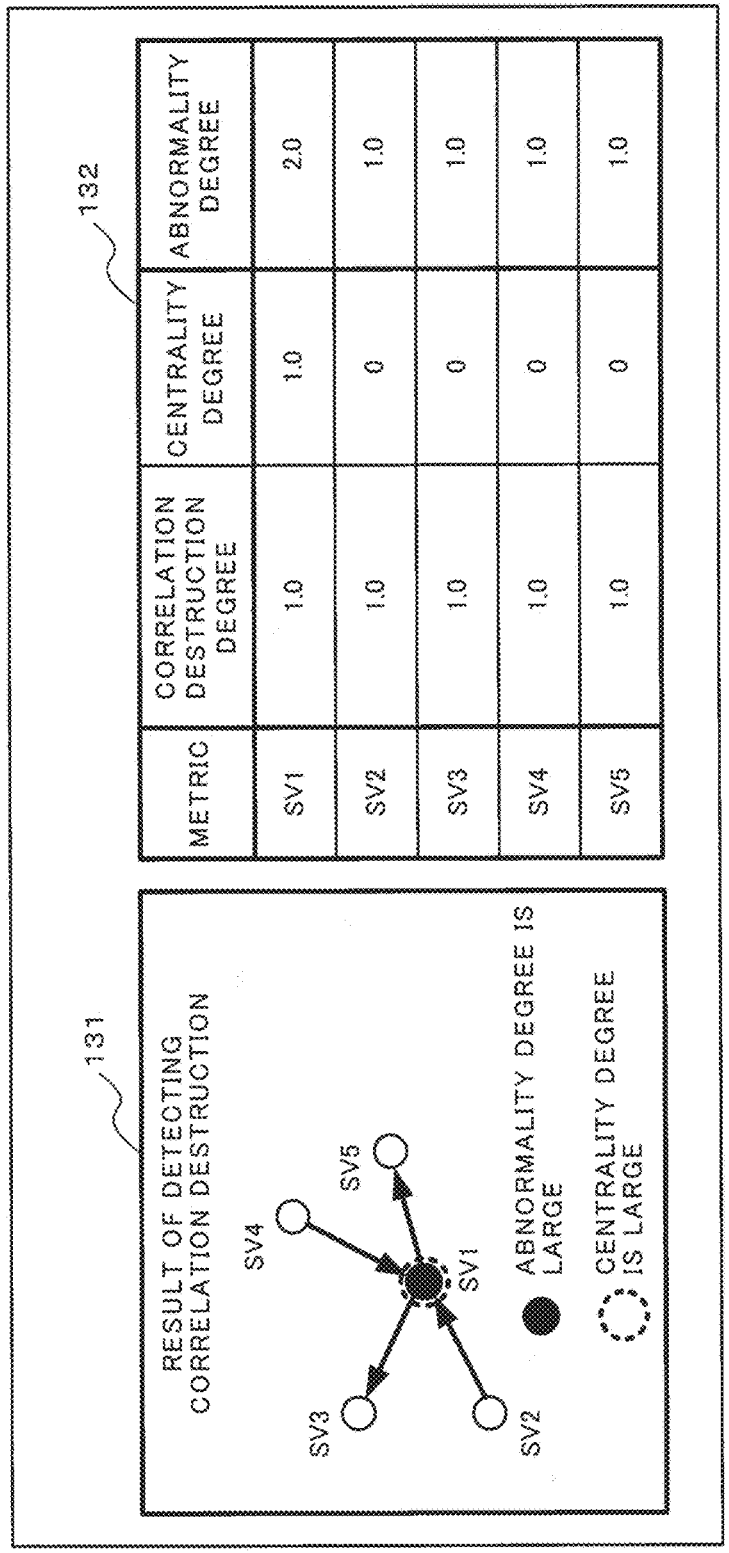
FIG. 9 is a diagram showing an example of an analysis result 130, in the first exemplary embodiment of the present invention.

FIG. 9 is a diagram showing an example of an analysis result 130 in the first exemplary embodiment of the present invention. In FIG. 9, the analysis result 130 includes a correlation-destruction detection result 131 and an abnormality degree list 132.

The correlation-destruction detection result 131 indicates the correlations on which the correlation destruction is detected on the graph showing the correlation model 122. According to the example of FIG. 9, the node corresponding to the metric which has the large centrality degree is circled by a dotted line, and the node corresponding to the metric which has the large abnormality degree is indicated by a black node. The abnormality degree list 132 indicates the metrics related to the correlations on which correlation destruction is detected, and the correlation destruction degrees, the centrality degrees, and the abnormality degrees of the metrics. According to the example of FIG. 9, the metrics related to the correlations on which the correlation destruction is detected are shown in an order of largeness of the abnormality degree.

The manager can grasp the monitored apparatus 200 or the resource which are related to the metric having the large centrality degree and the large abnormality degree, as a candidate of a fault cause, by referring to the analysis result 130.

For example, the abnormality calculation unit 104 outputs the analysis result 130 shown in FIG. 9 for the result of calculating the abnormality degrees shown in FIG. 7, to the display unit 105. The manager grasps the monitored apparatus 200 having the apparatus identifier SV1, as a candidate of a fault cause by referring to the analysis result 130 shown in FIG. 9.

Note that the abnormality calculation unit 104 may indicate the identifier of the monitored apparatus 200 or the resource related to the metric having the largest abnormality degree, as the candidate of the fault cause.

By carrying out the above, the operation of the first exemplary embodiment of the present invention is completed.

Figure 1:
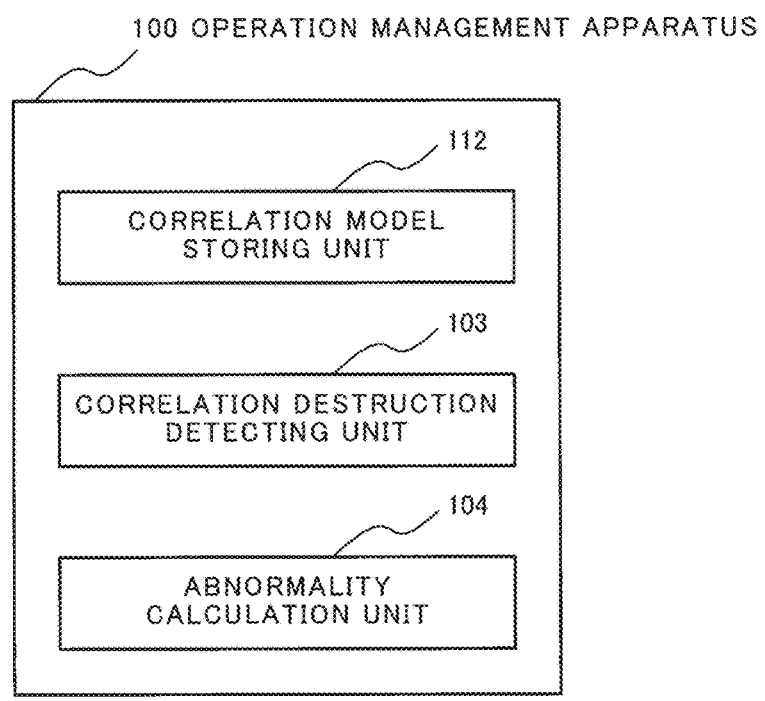
FIG. 1 is a block diagram showing a characteristic configuration of a first exemplary embodiment of the present invention.

Next, a characteristic configuration of the first exemplary embodiment of the present invention will be described. FIG. 1 is a block diagram showing a characteristic configuration according to the first exemplary embodiment of the present invention.

Referring to FIG. 1, an operation management apparatus 100 of the first exemplary embodiment of the present invention includes a correlation model storing unit 112, a correlation destruction detecting unit 103 and an abnormality calculation unit 104.

The correlation model storing unit 112 stores a correlation model including one or more correlation functions each of which indicates a correlation between two metrics different each other among a plurality of metrics in a system. The correlation destruction detecting unit 103 detects correlation destruction of the correlation which is included in the correlation model by applying newly inputted values of the plurality of metrics to the correlation model. The abnormality calculation unit 104 calculates and outputs a centrality degree which indicates a degree to which a first metric is estimated to be center of distribution of correlation destruction on the basis of a correlation destruction degree of one or more correlations between each of one or more second metrics having a correlation with the first metric and each of one or more metrics other than the first metric among the plurality of metrics.

According to the first exemplary embodiment of the present invention, it is possible to judge a fault cause correctly, in the invariant analysis. The reason is that the abnormality calculation unit 104 calculates and outputs a centrality degree which is a degree to which the first metric is estimated to be center of distribution of correlation destruction on the basis of a correlation destruction degree of correlations between each of one or more second metrics having a correlation with the first metric and each of one or more metrics other than the first metric among the plural metrics.

Moreover, according to the first exemplary embodiment of the present invention, it is possible to judge a fault cause more correctly, in the invariant analysis. The reason is that the abnormality calculation unit 104 calculates the abnormality degree of the first metric on the basis of a correlation destruction degree of correlations between the first metric and each of one or more second metrics, and the calculated centrality degree of the first metric.

Moreover, according to the first exemplary embodiment of the present invention, it is possible to grasp the center of the distribution of correlation destruction which is used for judging a fault cause, in the invariant analysis. The reason is that the abnormality calculation unit 104 indicates a metric having the large centrality degree on the graph showing the correlation destruction on the correlation model 122, in the analysis result 130.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2012-011076, filed on Jan. 23, 2012, the disclosure of which is incorporated herein in its entirety by reference.

REFERENCE SIGNS LIST

- 100 operation management apparatus
- 101 performance information collecting unit
- 102 correlation model generation unit
- 103 correlation destruction detecting unit
- 104 abnormality calculation unit
- 105 display unit
- 111 performance information storing unit
- 112 correlation model storing unit
- 113 correlation destruction storing unit
- 121 sequential performance information
- 122 correlation model
- 123 correlation destruction information
- 130 analysis result
- 131 correlation-destruction detection result
- 132 abnormality degree list
- 200 monitored apparatus

What is claimed is:

1. A method for detecting abnormality of a system, the method comprising:
   collecting performance information of a set of metrics, each of the metrics in the set being a resource in a computer of the system;
   detecting correlation destruction based on a correlation model and the collected performance information of the set of metrics;
   calculating a centrality of distribution of correlation destruction for a metric in the set on which the correlation destruction is detected, by counting a number of correlations for which correlation destruction is detected with respect to other metrics in the set that are correlated with the metric;
   determining whether an abnormality exists for the metric by comparing centralities of the metrics in the set;
   responsive to a determination that the abnormality exists, displaying:
      a first metric of the resource on which the abnormality exists, and
      a second metric related to the first metric, the second metric being detected based on the correlation model,
      wherein the displaying includes:
         displaying the first metric and the second metric in different forms and in association with each other, indicating that the first metric is a metric causing the correlation destruction and the second metric is a metric related to the correlation destruction; and
   handling a failure related to the first metric, when an indication is inputted in response to the displaying.

2. The method according to claim 1, wherein detecting correlation destruction includes:
   detecting the correlation destruction when a difference between an estimation value and a measurement value of one of the metrics is equal to or larger than a predetermined value.

3. The method according to claim 1, wherein displaying the first metric includes:
   displaying the first metric in association with the performance information indicating the abnormality and the second metric.

4. The method according to claim 1, further comprising:
   calculating a correlation destruction degree; and
   determining whether the abnormality exists further based on the correlation destruction degree.

5. A non-transitory computer readable storage medium recording thereon a program, when executed, causing a computer to perform a method comprising:
   collecting performance information of a set of metrics, each of the metrics being a resource in a computer of a system;
   detecting correlation destruction based on a correlation model and the collected performance information of the set of metrics;
   calculating a centrality of distribution of correlation destruction for a metric in the set for which the correlation destruction is detected, by counting a number of correlations on which correlation destruction is detected with respect to other metrics in the set that are correlated with the metric;
   determining whether an abnormality exists for the metric by comparing centralities of the metrics in the set;
   responsive to a determination that the abnormality exists, displaying:
      a first metric of the resource on which the abnormality exists, and
      a second metric related to the first metric, the second metric being detected based on the correlation model; and
      wherein the displaying includes:
         displaying the first metric and the second metric in different forms and in association with each other, indicating that the first metric is a metric causing the correlation destruction and the second metric is a metric related to the correlation destruction; and handling a failure related to the first metric, when an indication is inputted in response to the displaying.

6. The non-transitory computer readable storage medium according to claim 5, wherein detecting correlation destruction includes:
    detecting the correlation destruction when a difference between an estimation value and a measurement value of one of the metrics is equal to or larger than a predetermined value.

7. The non-transitory computer readable storage medium according to claim 5, wherein displaying the first metric includes:
    displaying the first metric in association with the performance information indicating the abnormality and the second metric.

8. The non-transitory computer readable storage medium according to claim 5, further comprising:
    calculating a correlation destruction degree; and
    determining whether the abnormality exists further based on the correlation destruction degree.

9. A method for detecting abnormality of a system, the method comprising:
    collecting performance information of a set of metrics, each of the metrics being a resource in a computer of the system;
    detecting correlation destruction based on a correlation model and the collected performance information of the set of metrics;
    calculating a centrality of distribution of correlation destruction for a metric in the set for which the correlation destruction is detected, by counting a number of correlations on which correlation destruction is detected with respect to other metrics in the set that are correlated with the metric;
    determining whether an abnormality exists for the metric by comparing centralities of the metrics;
    responsive to a determination that the abnormality exists displaying:
        a first metric of the first resource on which the abnormality exists, and
        a second metric related to the first metric, the second metric being detected based on the correlation model and indicating the abnormality exists on a second resource;
        wherein the first metric and the second metric are correlated; and
        wherein the displaying includes:
            displaying the first metric and the second metric in different forms and in association with each other, indicating that the first metric is a metric causing the correlation destruction and the second metric is a metric related to the correlation destruction; and
    handling a failure related to the first metric, when an indication is inputted in response to the displaying.

10. The method according to claim 9, further comprising:
calculating a correlation destruction degree; and
determining whether the abnormality exists further based on the correlation destruction degree.

* * * * *